United States Patent [19]

Jeffes

[11] 4,261,553

[45] Apr. 14, 1981

[54] METHOD FOR CONTAINING LIQUID PHASES IN A VESSEL

[75] Inventor: James H. E. Jeffes, London, England

[73] Assignee: National Research Development Corporation, London, United Kingdom

[21] Appl. No.: 962,050

[22] Filed: Nov. 20, 1978

Related U.S. Application Data

[63] Continuation-in-part of Ser. No. 922,206, Jul. 6, 1978, abandoned.

[30] Foreign Application Priority Data

Jul. 11, 1977 [GB] United Kingdom ............... 29071/77

[51] Int. Cl.³ ............................ C22B 9/02; C21B 3/04
[52] U.S. Cl. .................................. 266/204; 266/227; 266/233
[58] Field of Search ....................... 266/204, 227, 233; 75/10 R, 65 R

[56] References Cited

U.S. PATENT DOCUMENTS

| | | | |
|---|---|---|---|
| 3,764,296 | 10/1973 | Gerlach | 75/10 R |
| 3,843,351 | 10/1974 | Smith | 75/65 R |
| 3,917,479 | 11/1975 | Sayce | 75/65 R |

FOREIGN PATENT DOCUMENTS

| | | |
|---|---|---|
| 1118202 | 6/1968 | United Kingdom . |
| 1270669 | 4/1972 | United Kingdom . |
| 1282956 | 7/1972 | United Kingdom . |

OTHER PUBLICATIONS

"Continuous Steelmaking", Steel Times, pp. 323-324, (Mar. 17, 1967).

*Primary Examiner*—P. D. Rosenberg

[57] ABSTRACT

In many situations it is desirable for two or more liquid phases of different densities to be contained in a vessel with the upper phase out of contact with the vessel walls. Such a situation is the refining of molten metals, e.g., copper, wherein a layer of corrosive slag exists in the refining process above the molten metal. In conventional furnaces the slag will attack the furnace walls.

This invention provides a method which can be employed in such situations comprising two or more liquid phases of different densities in a vessel having an axis which is substantially vertical, rotating the liquid phases about the axis of the vessel and simultaneously constraining the least dense liquid phase to rotate less rapidly than the most dense liquid phase such that the miniscus of the least dense liquid phase adopts a degree of curvature less than the degree of the interface between the least dense liquid phase and the phase immediately below and the least dense liquid phase does not contact the internal surface of the vessel.

Such a method can, for example, also be employed in extraction procedures between liquid phases in addition to its application in metal refining.

The invention also provides a suitable vessel and apparatus for the method.

14 Claims, 5 Drawing Figures

ROTATING REACTOR - SCHEMATIC

ROTATING REACTOR-SCHEMATIC

FIG. 2.
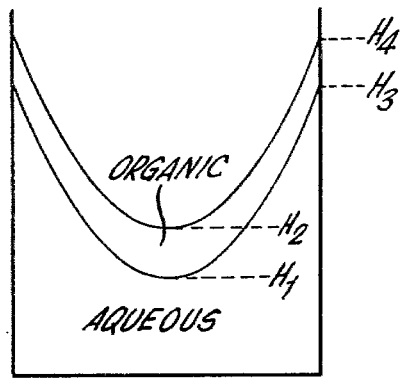
1. NO GAS FLOW
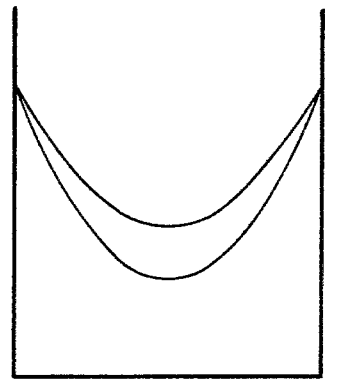
2. CRITICAL REVERSAL POINT
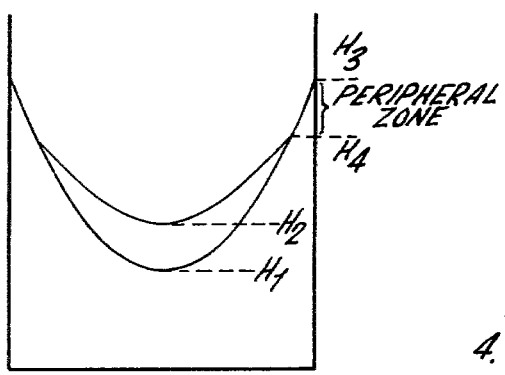
3. REVERSAL
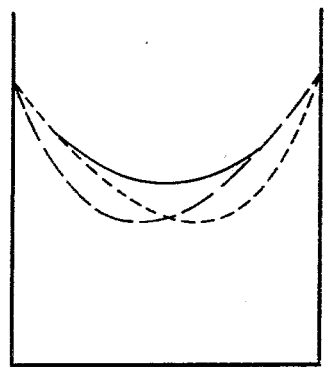
4. VORTEX OSCILLATION AND BROADENING
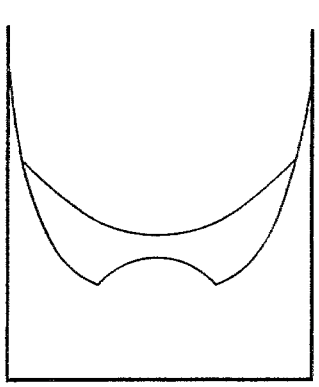
5. HORN FORMATION
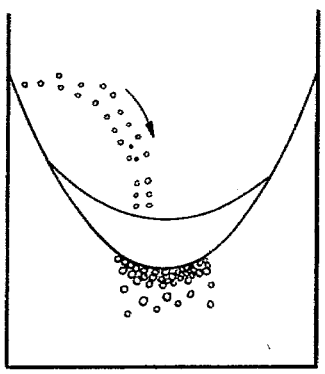
6. SPLASHOVER AND FOAMING

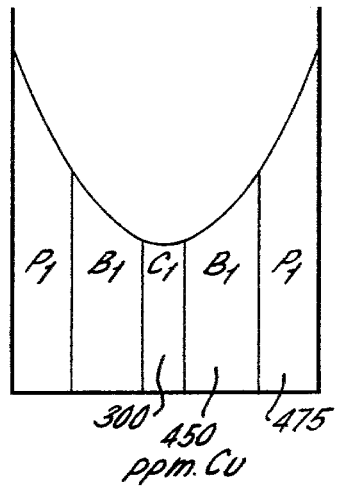
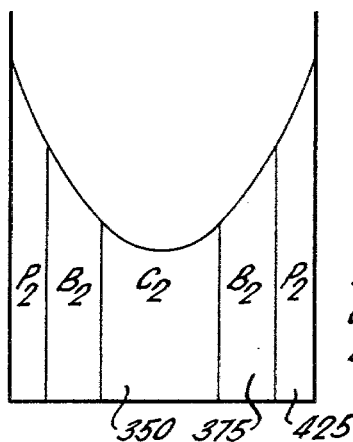
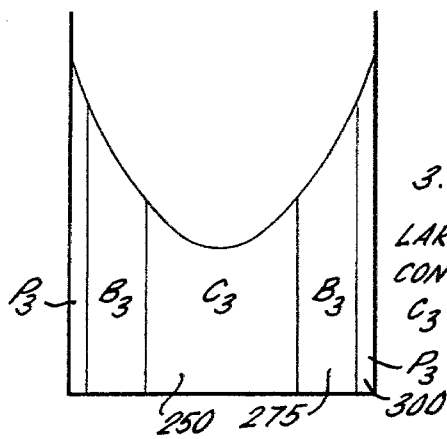
FIG. 4.
P = PERIPHERAL ZONE CONCENTRATION
C = CENTRAL ZONE CONCENTRATION
B = BULK CONCENTRATION
1. POOR MIXING
POOR EXTRACTION; AVERAGE CONCENTRATION ≈ $P_1$
2. INTERMEDIATE MIXING
IMPROVED EXTRACTION; AVERAGE CONCENTRATION ≈ $C_2 < P_1$ BUT $C_2 > C_1$
3. STRONG MIXING
LARGE EXTRACTION; AVERAGE CONCENTRATION $C_3$, $B_3$ $C_3 \ll C_2$

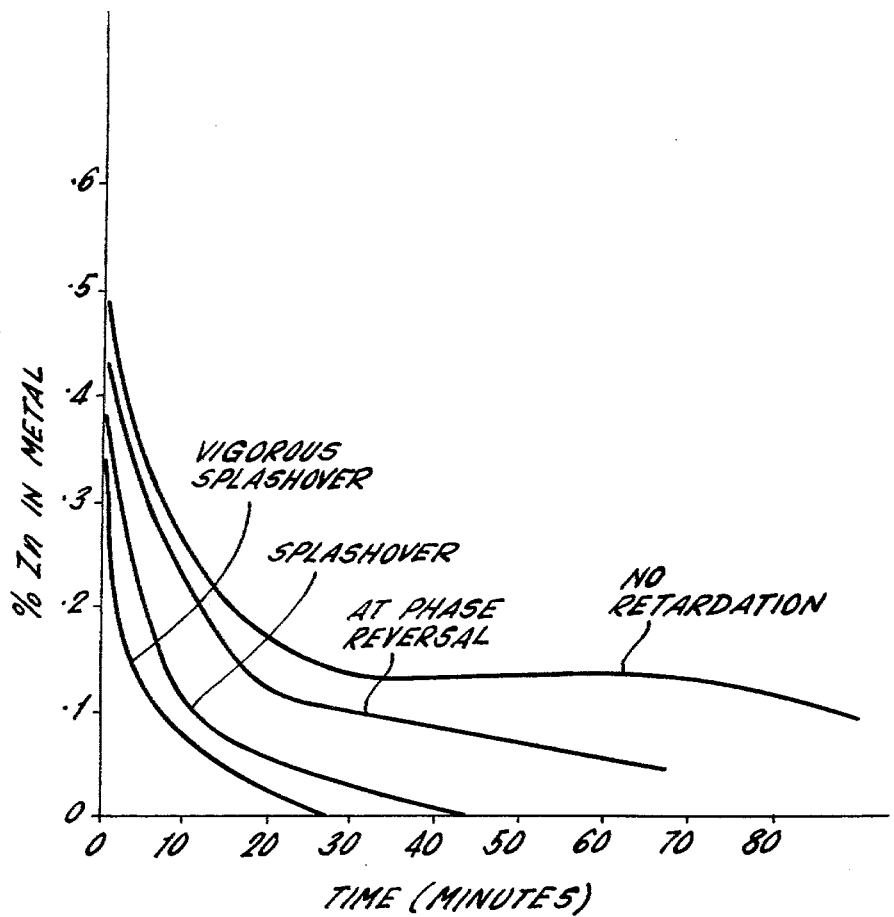

METHOD FOR CONTAINING LIQUID PHASES IN A VESSEL

RELATED APPLICATIONS

This application is a continuation-in-part application of U.S. application Ser. No. 922,206, filed July 6, 1978 and now abandoned.

BACKGROUND OF THE INVENTION

1. FIELD OF THE INVENTION

This invention relates to a method for containing liquid phases and to a vessel for use in such a method.

2. DESCRIPTION OF THE PRIOR ART

In many processes for producing or refining metals a problem is encountered in selecting materials for constructing containers or other vessels so as to withstand the effect both of the molten metal and of a slag, matte or molten salt phase (which are less dense than the metal). This problem is generally overcome by using vessels having refractory linings which are basic (e.g. burnt dolomite) or acidic (e.g. silica) depending upon the particular process. This, of course, limits the compositions of the slags that can be used since an acid slag attacks basic refractories and vice versa, and some aggressive melts attack both. The use of so-called "super-refractory" materials such as titanium carbide or boron nitride is too expensive for commercial application on a large scale and even these materials are not resistant to all metal+slag combinations.

The problem of containing two liquids of different chemical properties in a single vessel occurs in many other fields in addition to high temperature metallurgy.

It would, therefore, clearly be useful to be in possession of a method whereby, for example, two immiscible liquids could be contained in a vessel such that only one (the denser) contacts the container wall.

SUMMARY OF THE INVENTION

According to the invention there is provided a method for containing two or more liquid phases of different densities in a vessel having an axis which is substantially vertical, which axis is preferably a longitudinal axis, which method comprises rotating the liquid phases about the axis of the vessel and simultaneously constraining the least dense liquid phase to rotate less rapidly than the most dense liquid phase such that meniscus of the least dense liquid phase adopts a degree of curvature less than the degree of curvature of the interface between the lease dense liquid and the phase immediately below and the least dense liquid phase does not contact the internal surface of the vessel.

The rotation of the liquid phases is usually achieved by rotating the entire vessel about its axis. It is also envisaged that a stirrer could be employed in some applications, the vessel being fixed in position.

The liquid phases can be separate, immiscible liquids, or, the phases produced on mixing partially miscible liquids. The liquids can be present in the vessel before rotation or can be added when the vessel is already rotating. The most dense liquid may, alternatively, be present in the vessel before rotation and the lighter liquids added after rotation has been established. In this latter procedure the lighter liquids may be added from a centrally positioned conduit, or other adding means positioned away from the internal surface of the vessel, so as to avoid any contact between this surface and the lighter liquids.

It is envisaged that the present method is applicable to a liquid mixture of any number of coexistent liquid phases, but a two-phase system is probably the most important case.

Preferably, the vessel is substantially cylindrical in shape with a substantially circular cross-section, although the present method is applicable to vessels of many cross-sectional shapes. Thus, the method may, for example, be carried out in a cylindrical vessel having its longitudinal axis vertically mounted.

The method of constraining the rate of rotation of the least dense liquid phase (or, where several liquid phases are present, and, if appropriate, least dense phases) can, for example, involve the use of a physical solid barrier positioned in the lighter liquid phase. In a preferred embodiment, however, the vessel may be provided with one or more jets which each direct a flow of fluid (gas or liquid) onto the liquid surface in a tangential direction opposed to the direction of rotation.

The invention, therefore, also provides a vessel for containing liquids and having an axis, which axis is vertically mountable and is preferably a longitudinal axis, which vessel comprises a chamber mounted for rotation about the axis and having means for constraining the rotation of liquid therein such as at least one jet for conveying fluid into the chamber in a tangential direction.

As an alternative to a chamber mounted for rotation, the chamber may be provided with stirring means for creating rotation of any liquid in the vessel (when it is in use) about the axis. It is also possible to utilize both methods for achieving the desired rotation simultaneously.

The following description is given further to illustrate and explain the invention:

In a cylindrical vessel rotating about its axis in a vertical direction and containing, say, two immiscible liquids, the equilibrium surface of any liquid thus rotated is a paraboloid which is dependent only upon the diameter and rate of rotation of the vessel, it is not dependent on the density of either of the liquids. Two immiscible liquids thus rotated form an inter-layer which is paraboloid (parallel to the surface layer of the upper liquid), and the upper liquid is not, therefore, prevented from coming into contact with the vessel walls. However, where a relatively small amount of slag is present on a large rotating mass of molten metal, it has been possible successfully to float a thin layer of slag on the metal so that spreading of the slag is restrained as a result of surface tension effects. Since the paraboloids of rotation in such a system are parallel, such a procedure is, however, only possible where the amount of the lighter liquid is small and the surface tension effect is sufficiently great.

If, however, the upper layer is constrained to rotate less rapidly than the lower one, its surface becomes a less deep paraboloid so that when the critical difference in rate of rotation of the two liquids is reached the upper liquid ceases to make contact with the vessel walls. The resulting system, with an upper liquid layer separated from the vessel walls, can be maintained in a stable manner.

This result can be achieved by dipping a suitably shaped solid brake into the upper liquid (say, shaped like a Maltese cross). The same result, can, however, be much better achieved by directing onto the upper liquid a jet of gas impinging on it near to the vessel wall and in a direction tangentially opposed to the direction of rotation of the vessel.

In addition, a very stable pool of the lighter liquid can be established on the heavier one by the use of such a jet, and this jet continues to achieve this even when the upper liquid has parted from the vessel wall and the jet then plays on the bare surface of the lower liquid so exposed. This effect is apparently due to the transfer of negative momentum (the braking action) to the upper liquid from a layer of the denser liquid, which, slowed down by the gas jet, moves down from the vessel walls and along the interface between the two liquids thus providing the necessary liquid-liquid coupling to keep the pool of lighter liquid rotating less rapidly than the denser liquid. This has been confirmed by injecting colored water into the rotating system and observing its subsequent movement.

Furthermore, if the gas velocity is increased to a suitable value, the denser liquid can be broken up at the points of impact of the fluid jets into a rain of droplets which fall into and through the pool of lighter liquid causing mixing of the two liquids with or without the formation of an emulsion of the two liquids. This can result in a multi-layer system with the emulsion between heavier and lighter liquids. This type of emulsion system is very suitable for promoting the inter-liquid contact necessary for mass transfer of dissolved materials from one phase to another. Thus, the present invention may be utilized in many extraction procedures.

The invention includes a process for extracting a substance from one phase of a multi-phase liquid system into another phase of the system, which process comprises effecting the extraction whilst subjecting the system to a method in accordance with the invention. As already indicated, producing a rain of droplets of the denser liquid which falls into and through the ligher liquid can assist efficient extraction in such a process.

The emulsified layer together with unemulsified ligher liquid does not touch the container during the above type of operation.

If the velocity of the gas jet is reduced to its former value, the liquids separate from each other and the situation is restored wherein the distinct liquid layers simply co-exist with the lighter liquid out of contact with the container wall.

The above type of mixing system can also be achieved by the use of a sufficiently powerful solid barrier (possibly rotating in a direction opposite to the direction of liquid rotation).

The fluid from the jets may be a gaseous reactant in a chemical process occurring in the vessel and may thus serve a dual role as a brake on the rate of rotation of the lighter liquid and as a chemical reactant. The present method may also be carried out using recycled material from the vessel as the fluid which is fed to the tagential jets.

The jets may be movably mounted in the vessel so that as the lighter liquid draws away from the vessel walls, they move radially inwards following the boundary of the lighter liquid. This latter approach is an alternative to the braking action caused by interfacial flow of a layer of the heavier liquid when fixed jets play on its exposed surface (see above) once the lighter liquid boundary has moved inwards from the vessel walls.

By increasing the rate of rotation of the liquids and/or the vessel, the inter-layer parabola deepens until eventually it touches the bottom of the vessel. Thus, by suitably adjusting the rotation speed a point may be reached where only the upper liquid phase contacts one particular (usually central) region of the vessel bottom. If a hole is made in the vessel bottom at this point, the lighter phase may be drawn off to the exclusion of the other phases. Furthermore, the hole in the vessel bottom can constitute a sufficiently small region such that the use of a "super-refractory" (e.g. titanium carbide) in the lining of this hole becomes economic.

Thus, the present method can be used in a continuous process or other system where material of one liquid phase is to be drawn off. This drawing off may be at the bottom of the vessel (as described above) or at the surface of any type of vertically mounted or substantially upright (with respect to the vessel's longitudinal axis) vessel is a suitable suction device is used.

The axis of the vessel does not have to have an exactly vertical orientation for the present method to work, it is sufficient that the axis be substantially vertical. It is, however, preferred that the axis actually be as near vertical as possible.

A solid brake may be positioned at any suitable point in the vessel such that once a stable rotating system has been achieved, the composition of material to be drawn off may be selected for any particular application of the method, depending upon the chosen brake position, e.g. the composition of material being drawn off at the bottom of the vessel (with the type of apparatus referred to above having a hole in the vessel bottom) may be adjusted by varying the brake position.

One example of the usefulness of the present method is its application to the refining of copper metal. Several slags can be used in this process, and since copper has a high thermal conductivity, there is little convection stirring in the metal during ordinary fire refining to assist the desired oxidation of impurities.

The usual manner of stirring the metal to bring it into contact with the slag is to blow gas through pipes or tuyeres immersed in the metal, also to immerse wooden poles below the metal surface which agitates the metal by gas evolution thereby lowering the oxygen content of the metal. The present method would enable slags of powerfully acid or basic nature to be used without attack on the furnace refractories and using an oxidizing or reducing gas at will.

The use of the invention for a metallurgical process has been modelled using reactors of a diameter in the order of 10 cm operating at some 2 to 300 rpm. On an industrial scale the reactor diameter would be in the order of 1 m. If such a reactor were rotated at 240 rpm, the equilibrium depth from the bottom to the top of the liquid paraboloid for the lighter liquid would be some 8.75 m. Such a ratio of height/diameter would in general be unsuitable and is in fact not necessary, being based on an assumption of constant angular velocity. The more significant criterion is the peripheral velocity. For the same peripheral velocity as the 10 cm reactor a 1 m reactor would rotate at only 24 rpm and produce the paraboloid depth of 8.75 cm. In practice this depth is insufficient to contain the proportion of flux or slag to be expected and a paraboloid depth of some 50 cm would be reasonable. To produce this paraboloid depth, the rate of rotation of the 1 m reactor should be about 60 rpm. Dimensions and rotational rates as just described would be suitable for the industrial refining of copper and similar metals which require temperatures in excess of 800° C. to melt the metal and slag and would permit the refining of copper and such similar metals with the known more efficient, but more corrosive slags as these slags could then be kept out of contact with the refractory lining of the vessel. In this way the life of the vessel would be prolonged, while the efficiency of the refining process would be considerably improved.

The critical gas flow rate will also depend on the diameter of the reactor. The following table indicates how the flow rate varies with vessel diameter and rotational speed when the speed is adjusted to maintain a substantially constant peripheral velocity:

| Vessel diameter cm | r.p.m. | Critical Gas flowrate 1/min. | |
|---|---|---|---|
| 8.5 | 350 | 3.2 | Working on a water/kerosene system) |
| 14.3 | 200 | 3.7 | |
| 20.6 | 146 | 4.9 | |

These figures indicate that the flow rate will have to be increased despite the reduction in rotational speed as the diameter of the vessel is increased.

DESCRIPTION OF THE DRAWINGS

The present invention will now be further described and illustrated with reference to the accompanying drawings, in which:

FIG. 2 shows in diagrammatic form the various operating modes which a simple two-phase liquid system adopts during the employment of an apparatus of the type shown in FIG. 1 in effecting the method of the invention;

FIG. 4 illustrates various types of mixing obtained when using the present invention in an extraction procedure as described in Example 2 given below; and FIG. 5 illustrates the experiments of Example 3 given below.

DESCRIPTION OF THE PREFERRED EMBODIMENTS

Figure 1:
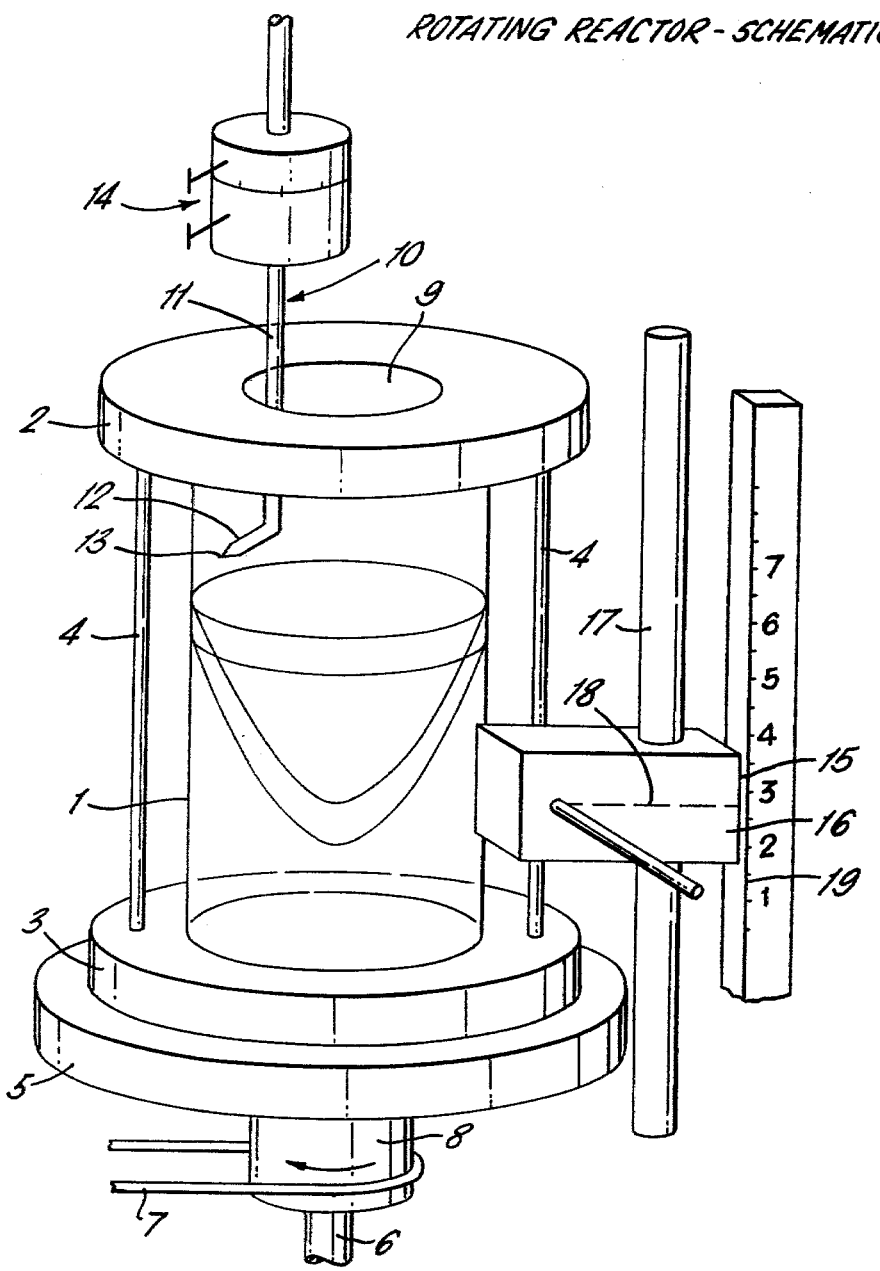
FIG. 1 shows in diagrammatic form a simple apparatus which may be used to illustrate the present method.

The apparatus seen in FIG. 1 comprises a glass cylinder 1 provided with a top plate 2 and base plate 3 fastened to each other via studs 4. Beneath base plate 3 is a metal support dish or turntable 5 mounted on a vertical shaft 6 supported by bearings (not shown). Cylinder 1 can be rotated by the action of a motor (not shown) provided with a variable speed control and connected to shaft 6 via belt 7 and pulley 8.

Top plate 2 has a hole 9 therein through which a lance 10 extends. Lance 10 comprises a glass tube 11 having an end portion 12 drawn out to a jet 13, tube 11 being mounted in a support 14 which is adapted for raising or lowering of the lance 10 and for rotating the same to permit variation of the jet angle. The end of tube 11 is connected to a source of pressurised gas (not shown).

Adjacent the cylinder 1 is a height gauge 15 comprising a Perspex block 16 sliding on a rod 17. Block 16 is provided with a reference mark 18 which can be used to read a position on scale 19.

Cylinder 1 is shown in FIG. 1 containing two immiscible liquids of different densities (e.g. kerosene and water). The liquids are shown in the position adopted when the cylinder is rotated but the gas jet is inoperative.

Three versions of this apparatus have been constructed, the one shown in FIG. 1 in which the cylindrical vessel has an internal diameter of 8.5 cm, a similar one with an internal vessel diameter of 14.3 cm and a high temperature version with a Pyrex glass vessel of 9.4 cm internal diameter in which liquid tin and a "slag" could be studied. The last of these was somewhat different in layout, since the operation of the reactor can only be observed from above when using an opaque heavier phase.

Using an apparatus of this type it will be apparent that the vortex in the liquid system contained in the cylinder 1 when this is rotated can be studied as a function of such variables as the speed of cylinder rotation, gas jet flow rate, lance height above the vortex, jet diameter, liquid densities and jet angle. The results of such studied are set out in Example 1 below.

In FIG. 2(1) is seen the situation which prevails when the cylinder 1 is merely rotated without the use of a jet of gas to impart negative momentum to the rotating upper phase. The distance between $H_4$, the top of the lighter phase at the cylinder wall, and $H_3$, the top of the denser phase at the cylinder wall, is the same as the distance between $H_2$, the top of the lighter phase in the vortex centre, and $H_1$, the top of the denser phase in the vortex centre. The meniscus of the lighter phase and the interface between phases are substantially parallel.

When the gas jet is brought into play to constrain rotation of the lighter phase the distance between $H_4$ and $H_3$ is gradually reduced as the speed of lighter phase rotation is reduced relative to the speed of denser phase rotation. At a critical point $H_4$–$H_3$ is zero (FIG. 2(2)), and if the speed of rotation of the lighter phase is further constrained by a higher gas flow, "phase reversal" occurs at the wall of cylinder 1, with the lighter phase "sinking" into the well of denser phase, leaving a peripheral zone of the latter in contact with the wall (FIG. 2(3)). The lighter phase is now no longer in contact with the wall of cylinder 1, and there is an appreciable difference between the curvature of the paraboloids of the lighter phase meniscus and the interface between phases.

As the gas flow rate is increased, $H_4$ drops further below $H_3$ until a point is reached when very large increases in gas flow rate are needed for a further drop of $H_4$ relative to $H_3$. A point is soon reached when with an apparatus employing a single gas jet (as described above), and particularly if there is any degree of eccentricity in the cross-section of cylinder 1, vortex oscillation occurs (FIG. 2(4)). It is envisaged that such a phenomenon could be avoided by carefully balancing a plurality of gas jets around the periphery of cylinder 1.

Eventually, a type of "horn" vortex is produced in water-kerosene systems (FIG. 2(5)) which can be regarded as a type of vortex oscillation standing wave. During the stages of vortex oscillation the shape of the vortex appears to change somewhat, the vortex base rising and broadening. At the stage of horn formation small internal eddies are present in the liquid.

At relatively low speeds of rotation horn formation is accompanied by foaming which appears to be due to bubbles of the lighter phase being forced into the denser phase by the gas jet. The bubbles are sucked down into the centre of the vortex. Foam formation appears to be dependent upon the lance height above the vortex. At low rotation speeds, the vortex is flattest making the formation of bubbles and pushing of the same into the lower phase easier. In general, at any given rotation speed, the lower the lance height above the vortex the greater the degree of foaming. Foaming is obviously of importance in extraction procedures employing the present invention since greater phase mixing is achieved but care has to be taken to avoid trapping of lighter liquid high up on the wall of cylinder 1 (possibly by using a multi-level gas jet).

It is also observed that the higher the density of the denser phase the less foaming is produced (presumably due to the increased difficulty in forcing bubbles of the lighter phase down into the denser phase).

It has been observed that at a fixed lance height the vortex is more stable the lower the gas flow rate. The higher the rotation speed at given lance height the larger is the gas flow rate which is needed to induce liquid vortex oscillation in an apparatus as described herein. Decreasing the lance height also reduces vortex stability for a given rotation speed.

After horn formation, further increasing the gas flow rate produces the "splashover" situation shown in FIG. 2(6). The gas jet tears away the denser phase from the wall of cylinder 1 and the droplets of denser phase thus-produced fall back into the vortex.

Lowering the lance height makes splashover more likely at lower gas flow rates. An extreme form of splashover which can be obtained at low rotation speeds where a layer of the denser phase is removed from the wall of cylinder 1 is termed "peel-back". Indeed, at some lower speeds of rotation peel-back is obtained rather than splashover. At higher speeds of rotation the greater the gas flow rate and/or the lower the lance height the greater the likelihood of peel-back rather than just splashover.

Phase reversal, in general, appears to be achieved with lower gas flow rates when the speed of rotation is increased and/or the lance height reduced. At higher speeds of rotation it seems to be easier to hold the phases in their reversed mode. Splashover can be achieved by lowering the lance height and reducing the jet angle. For peel-back, a larger jet angle with a more tangential gas flow is more effective.

The invention will now be further illustrated by way of Examples.

EXAMPLE 1

The effect of varying the operating parameters of the rotating reactors on the onset of phase reversal and splashover has been studied. The following parameters were varied:
(a) Vessel diameter
(b) Density of lower liquid
(c) Speed of rotation of the vessel
(d) Lance height
(e) Lance jet diameter
(f) Viscosity of upper liquid
(a) Vessel diameter.

Two vessels of 8.5 and 14.3 cm internal diameter were used to compare the phase reversal (A) and splashover (B) conditions in the water-kerosene system. The following results were obtained:

TABLE 1

| Speed of rotation | $N_2$ gas flow rate (liters/min) | | | |
|---|---|---|---|---|
| | 8.5 cm Vessel | | 14.3 cm Vessel | |
| rpm | A | B | A | B |
| 200 | — | — | 3.7 | 10.9 |
| 250 | 4.7 | 10.7 | 3.4 | 9.5 |
| 300 | 4.0 | 8.0 | — | — |
| 350 | 3.2 | 10.7 | — | — |

(Lance diameter 1.9 mm at datum level).

The datum level or height (Q) was taken as the level of the lighter liquid when the system was rotating and had been allowed to attain its equilibrium levels. It was observed in this and other experiments that the peripheral velocity of the vessel was an important factor, and it will be noted that the results obtained at 350 rpm in the smaller vessel are similar to those at 200 rpm in the larger vessel, the peripheral velocities being similar.

(b) Effect of density of heavier liquid.

Four liquids of widely varying densities were used as the heavier liquid. The critical gas flow rate required to produce phase reversal (A) and splashover (B) are given in Table 2 below.

TABLE 2

| Heavier liquid | | Gas flow rate Liters/minute | | Gas flow rate Density of heavier liquid | |
|---|---|---|---|---|---|
| Composition | Density | (A) | (B) | (A) | (B) |
| Water | 1.0 | 3.7 | 10.9 | 3.7 | 10.9 |
| Saturated BaCl$_2$ | 1.25 | 4.8 | 10.5 | 3.8 | 8.4 |
| Saturated lead sulphamate | 2.30 | 8.8 | 16.8 | 3.8 | 7.3 |
| Liquid tin | 5.95 | 20.0* | 25.0* | 3.4* | 4.2* |
| | | 20.0+ | N.D. | 3.4 | N.D. |

*In 9.4 cm diameter vessel at 320 rpm; others in 14.3 cm diameter vessel at 200 rpm. 2.0 mm lance diameter at normal datum height corrected to 1.9 mm to match other experiments. Gas not preheated.
+Gas preheated to 320° C.

It will be seen that the phase reversal gas flow rate is approximately proportional to the density of the heavier liquid. This is an unexpected result since doubling the flow rate doubles both the gas velocity and the mass of gas per unit time. The correlation of the splashover gas flow rate appears to be with the square root of the heavier liquid density. No satisfactory theoretical explanation for these effects has yet been found, but it is possible that the viscosity of the lower (or denser) liquid may be connected with this effect.

It was noted that the ratio of the phase reversal and splashover critical velocities became less as the heavier liquid density increased.

(c) Speed of rotation of vessel.

The effect of the rate of rotation on the critical gas velocities required to produce phase reversal and splashover were observed. It was found that in the reactors the critical gas velocities were decreased with increasing speed, but this was at least partly accounted for by the increase in the relative gas/liquid velocities due to higher liquid velocities. (This is illustrated in the figures given in Table 1 under Example 1(a) above).

(d) Effect on lance height.

The effect of varying the lance height was tested on a number of systems. The lance angle was of 30° downward from horizontal. It was found that the critical gas velocities were not very sensitive to lance height but that in general, raising the lance increased the critical gas flow rates and lowering it decreased these flow rates. Results are shown in Table 3.

TABLE 3

| System | Rate of rotation rpm | N₂ gas flow rate l/min | | | | | | Lance height from datum Q x(cm) |
|---|---|---|---|---|---|---|---|---|
| | | Reversal | | | Splashover | | | |
| | | Q + x | Q | Q − x | Q + x | Q | Q − x | |
| Kerosene/water (9.4 cm diam. reactor) | 350 | 3.2 | 3.2 | 3.1 | 11.6 | 10.7 | 8.9 | 0.5 |
| | 300 | 4.1 | 4.0 | 3.9 | 9.7 | 8.0 | 8.0 | 0.5 |
| | 250 | 5.0 | 4.7 | 4.0 | 11.7 | 10.7 | 8.9 | 0.5 |
| Kerosene/water (14.3 cm diam. reactor) | 250 | 3.5 | 3.4 | 3.1 | 10.0 | 9.5 | 9.1 | 0.8 |
| | 200 | 3.9 | 3.7 | 3.5 | 10.9 | 10.9 | 10.5 | 0.8 |
| Kerosene/saturated BaCl₂ (14.3 cm diam. reactor) | 250 | 4.6 | 4.6 | 4.3 | 10.9 | 10.3 | 10.0 | 0.8 |
| | 200 | 4.9 | 4.8 | 4.6 | 11.0 | 10.5 | 10.0 | 0.8 |
| Kerosene/saturated lead sulphamate (14.3 cm diam. reactor) | 250 | 8.7 | 8.7 | 8.2 | 19.2 | 18.0 | 16.8 | 0.8 |
| | 200 | 8.8 | 8.8 | 8.4 | 19.2 | 16.8 | 14.4 | 0.8 |

(e) Effect of lance jet diameter.

Two lance jets were used in the 14.3 cm diameter reactor, of 1.9 and 4.0 mm diameters respectively using water, barium chloride solution (D=1.25) and lead sulphamate solution (D=2.30). Kerosene was used as the lighter liquid. The critical gas velocities required to cause phase reversal were as follows:

TABLE 4

| Jet diameter | Water | | Barium chloride | | Lead sulphamate | |
|---|---|---|---|---|---|---|
| | 220rpm | 250rpm | 200rpm | 250rpm | 200rpm | 250rpm |
| 1.9 | 3.7 | 3.4 | 4.8 | 4.55 | 8.8 | 8.7 |
| 4.0 | 7.9 | 7.6 | 10.8 | 10.5 | 17.2 | 16.4 |
| Ratio of gas flow for two jets | 2.13 | 2.23 | 2.25 | 2.30 | 1.95 | 1.88 |

Within experimental error, the gas flow through the 4 mm jet was 2.12±0.15 that required by the 1.9 mm jet. The ratio of the jet areas is 4.43. Increasing the gas flow by a factor of 2.12 causes an increase in gas jet momentum of 4.49. It would thus thus appear that the gas jet momentum is a major factor in determining the critical phase reversal gas velocity.

(f) Effect of viscosity of upper liquid.

The effects of varying the viscosity of the upper liquid on the critical gas flow rate and the gas flow rate at splashover were tested by carrying out runs in the 14.3 cm diameter reactor with a single 1.9 mm jet using medicinal paraffin as the upper liquid instead of kerosene. The results obtained are given in Table 5 below.

TABLE 5

| | Rate of rotation of reactor | Critical gas flow rate l/min | | | |
|---|---|---|---|---|---|
| | | Kerosene | | medicinal paraffin | |
| | | Reversal | Splashover | Reversal | Splashover |
| Water/hydrocarbon | 250 | 3.1 | 9.1 | 5.6 | 8.4 |
| | 200 | 3.5 | 10.5 | 6.0 | 8.4 |
| Saturated BaCl₂/ hydrocarbon | 250 | 4.3 | 10.0 | 7.8 | 9.6 |
| | 200 | 4.6 | 10.0 | 8.1 | 9.6 |
| Saturated lead sulphamate/ hydrocarbon | 250 | 8.2 | 16.8 | 11.0 | 12.6 |
| | 200 | 8.4 | 14.4 | 11.4 | 13.2 |

It will be noted that with the viscous upper liquid the critical gas flow rate required for phase reversal is substantially increased, whereas that for splashover is decreased. It is thought that this is because when the upper phase is highly viscous it tends to behave more like a solid lens, and more energy is required to slow it down because velocity gradients inside it are less than in a less viscous liquid. The greater ease of splashover onset is difficult to explain. It is possible that the more "solid" behavior of the lighter liquid causes a steepening of the velocity gradient between the edge of the floating lens and the edge of the reactor, thereby increasing the tearing effect of the gas jet on the denser liquid.

EXAMPLE 2

Using an apparatus and system as described with reference to FIG. 1, it was decided to study the effect of gas flow rate on mass transfer between the phases. After investigating a number of possibilities, the extraction of copper from aqueous $CuSO_4$ solution by a kerosene solution of General Mills LIX64N, was chosen as the model system to be studied.

Apparatus

The rotating reactor as described above was used. Solution of 500 ppm Cu (w/v) acidified to pH=2 with $H_2SO_4$, and 20% (V/V) LIX64N in kerosene were made up. For sampling, glass syringes were used fitted with long tips of stainless steel tubing. A stop watch was used as a timer, and a stroboscope to monitor speed.

Procedure

Figure 3:
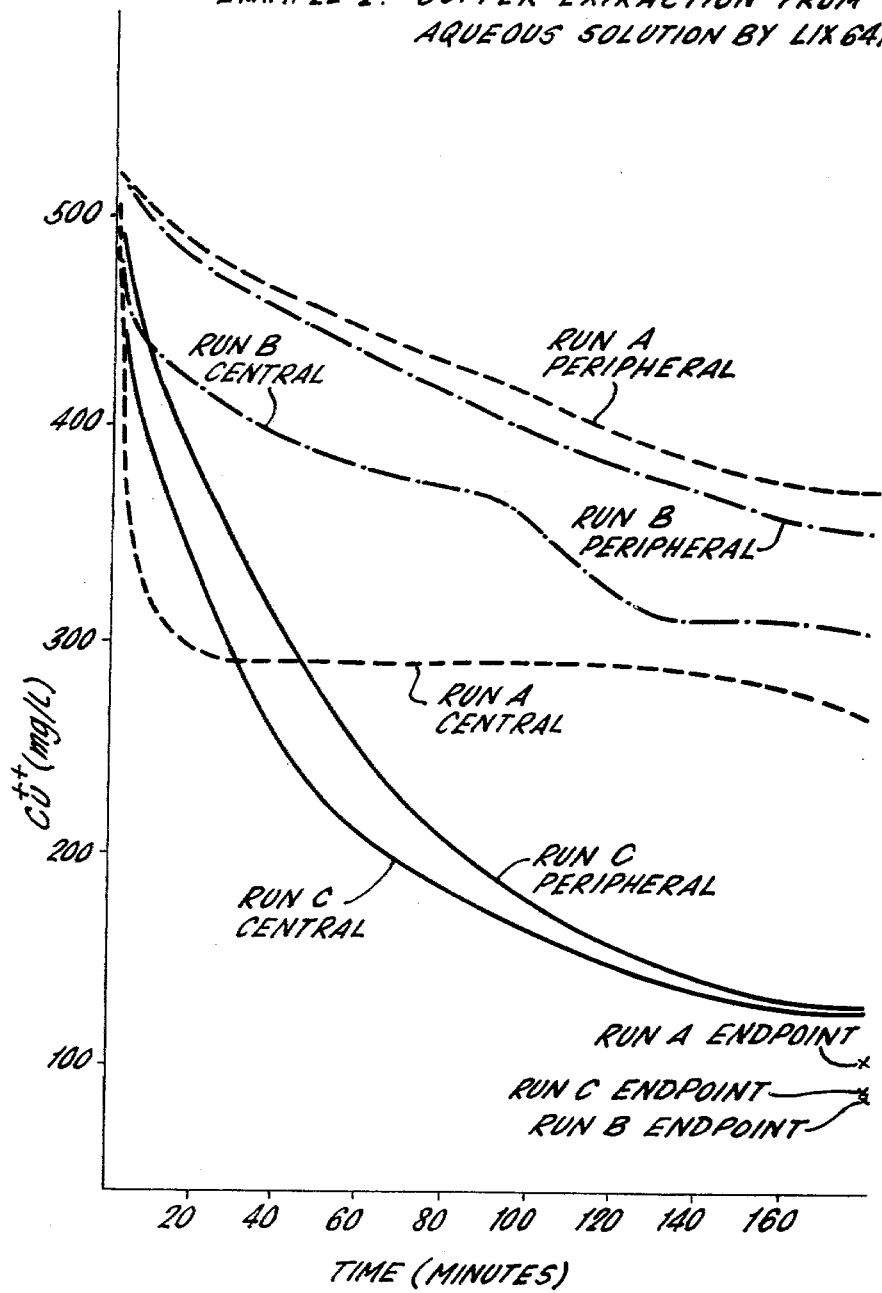
FIG. 3 illustrates the results of Example 2 given below.

A number of runs were carried out in the 9.4 cm. diameter reactor of 350 rpm and with the lance at the datum height (Q). The gas flow rates used there were 4/6 l/min (Run A), 8.0 l/min (Run B) and 10/7 l/min. (Run C). These corresponded to reversed phases (Run A), splashover (Run C) and an intermediate condition (Run B). The results of these runs are illustrated in FIG. 3.

Before a test run was begun, the appropriate value of Q was determined by experiment and the lance height thus adjusted. Q was taken as the height of the upper layer of liquid at the cylinder wall (which value varies with the rotation speed) using a kerosene-water system as the model prior to the extraction experiment proper. Then, once the rotating vessel has reached a steady speed, 500 ml of $CuSO_4$ solution was pipetted into it. The N₂ gas was turned on and set at the desired value. When the conditions had steadied, 50 ml of LIX-kerosene were pipetted into the centre of the vortex, every attempt being made to do this with minimum splashing and turbulence, while at the same time not interfering with the draining of the pipette. When draining stopped, a stopwatch was started and at 15 sec the pipette tip was touched to the wall of the cylinder and withdrawn. The aqueous phase was then sampled on a timed scheme for three hours.

Sampling was done with a hypodermic syringe fitted with a special tip. Samples were taken from two zones in the liquid. Peripheral samples were taken in the clear $H_3$-$H_4$ zone at the wall of the cylinder about $\frac{1}{2}$ cm below $H_3$. The syringe tip was a thin tube (0.7 mm o.d.) which was inserted into the peripheral zone at the required time, 180° around the tube from the lance jet. Sampling had to be done as quickly as possible in order to minimize the flow disturbance. Central samples were taken directly from the centre of the vortex at a point 2 cm below $H_1$ using a syringe fitted with a 26 cm long 2 mm o.d. stainless steel tube. This tube could reach into the centre of the vortex where it could be introduced without disturbing the flow. The syringe was placed in a jig to ensure that all central samples were taken in the same place. For the higher speeds $H_1$ was less than 2 cm above the cylinder bottom so samples had to be taken 0.5-1 cm from $H_1$. Care had to be taken to ensure that none of the organic phase was sucked up with the aqueous sample as this would result in low readings in the final analysis (as the organic phase kept on extracting copper).

After the fourth sample had been taken at 3 minutes, readings were made of $H_1$, $H_2$, $H_3$ and $H_4$. These were compared with data obtained using pure water and kerosene to ensure that the shape of the vortex was reproducible. It was felt that the addition of 500 ppm $Cu^{++}$ to the aqueous phase and the substitution of LIX-kerosene for pure kerosene should not make a great difference in the shape of the vortex and this was borne out by observations. The shape was again verified at the end of the run to make sure it had not changed as samples were removed. Speed of rotation was monitored with the stroboscope, every second sample.

At the end of the run, the gas and motor were shut off and the liquids transferred to a separating funnel for equilibration. The two phases were shaken and then allowed to separate over a period of one or two days and it was assumed that the equilibrium distribution of copper between the phases had been attained although this was not verified. A sample of aqueous phase was taken before each run and also from the equilibrated phases.

Observations

It was noted that at the lower gas velocities, the heavier phase was very inhomogeneous. This is illustrated in FIG. 3 where runs A, B and C are compared. These runs were carried out under similar conditions except that the gas flow rates were 4.6, 8.0 and 10.7 l/min respectively.

It will be noted that in run A, where phase separation had occurred, the rate of transfer of copper from the centre of the aqueous layer was initially rapid and then remained approximately constant for a long period of time before beginning to fall further. The copper concentration in the peripheral region of the aqueous layer fell slowly for the whole period of the experiment.

The other extreme of behavior shown in these experiments is shown in FIG. 3 for run C. Here there is little difference between the concentrations in the central and peripheral regions of the aqueous layer, and copper extraction is very much faster. This is considered to be due to rapid stirring of the aqueous layer caused by the tearing away of the denser liquid at the point of jet impingement and its intimate contact with the organic solution as the rain of aqueous droplets falls through it.

Run B exhibited behavior intermediate between these two extremes in that there was a smaller difference in concentration of the central and peripheral aqueous samples, but poor aqueous-kerosene interface agitation produced slow transfer of copper from one phase to the other.

It is considered that this mode of operation is represented by FIG. 4(1) where a relatively small cylindrical volume ($C_1$) of aqueous solution forms under the centre of the vortex which has descended from contact with the extractant. The relatively large peripheral annulus of aqueous layer, ($P_1$) is slowly diluted by solution from ($C_1$) so that its copper concentrations falls slowly.

When the gas velocity is increased, better mixing of the denser liquid occurs and this is illustrated in FIG. 4(2) where the central cylindrical volume ($C_2$) is larger and the difference in concentration between it and the outer volume ($P_2$) is smaller. FIG. 4(3) illustrates conditions of strong mixing, when the central cylinder ($C_3$) is larger still and the difference in concentration between it and the outer volume ($P_3$) is quite small. It is considered that these figures illustrate what is taking place in the denser liquid in the middle portions of the runs A, B and C in FIG. 3 respectively.

EXAMPLE 3

Experiments were carried out on a metal-"slag" system to determine the rate of mass transfer across the interface under various operating conditions. The system chosen was tin-stannous chloride in a 9.4 cm diameter reactor, and determining the rate of transfer of zinc from solution in the tin to solution as zinc chloride in the "slag" phase at 320°±5° C. The reaction

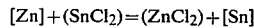

$$[Zn]+(SnCl_2)=(ZnCl_2)+[Sn]$$

(where the brackets [ ] and ( ) denote solutions in metal and slag phase respectively) is thermodynamically very favorable at this temperature.

5 kg of pure tin were placed in the reactor and heated to 320°±5° C.; 25 g metallic zinc was then added and the alloy stirred to ensure homogeneity. 125 g of anhydrous liquid stannous chloride was then poured into the vessel and the reactor rotated at 125 rpm with a gas jet of forming gas (90% $N_2$ 10% $H_2$) playing on its surface to prevent oxidation of the metal. Samples of metal and slag were then taken at intervals by lowering a glass capillary tube axially into the reactor and sucking up some metal by means of a suction bulb. Some of the stannous chloride "slag" froze on to the outside of the tube so that metal and slag samples were obtained simultaneously.

Runs were carried out under the following conditions:

1. With forming gas introduced vertically onto the surface of the "slag" so as to avoid oxidation of the metal but not to provide any slowing of the liquids.
2. With forming gas jetted onto the surface of the liquids in a manner similar to that of previous experiments. The gas was preheated to about 320° C. and the jet consisted of a 2.0 mm I.D. refractory tube mounted at 30° below horizontal.

The results of such experiments are illustrated in FIG. 5.

When no negative momentum was applied to the system, the initial zinc content of the metal phase fell rapidly to about one-third of its original value, then fell only slowly. It is thought that the fast initial fall was largely due to the disturbance of the system caused by the addition of stannous chloride and the start of rotation.

When sufficient gas was supplied to cause phase reversal, the zinc content continued to fall after the initial period, at about twice the rate observed when no negative momentum was applied.

When the gas flow rate was such that the system was undergoing splashover the zinc content of the metallic phase fell more rapidly until it was zero within the analytical method used in the 30–45 minutes depending on the vigor of the splashover process.

The results of the liquid tin experiments are considered to demonstrate that with dense liquids such as liquid metals, the mode of operation of the reactor which is the subject of this application not only enables the slag to be kept out of contact with the container walls, but produces good mixing in the separate phases and good interfacial contact. The gas flow rates used in the splashover experiments ensured that the segregation of the heavier liquid phase described in Example 2 above did not occur. The mass balance and end-of-run analytical results indicated that the liquid tin had been well stirred during these experiments.

I claim:

1. A vessel for containing two or more liquid phases of different densities such that that of said phases which is the least dense does not contact said vessel internal surface, said vessel having an internal surface and a vertically mountable axis, said vessel including a chamber mounted for rotation about said axis and a constraining means for constraining the rate of rotation of a liquid therein.

2. A vessel according to claim 1, wherein said constraining means comprises means for conveying at least one jet of fluid into said chamber in a tangential direction.

3. A vessel for containing two or more liquid phases of different densities such that that of said phases which is the least dense does not contact said vessel internal surface, said vessel having an internal surface and a vertically mountable axis, said vessel including a chamber, a stirring means for effecting rotation of a liquid in said vessel about said axis, and a constraining means for constraining the rate or rotation of a liquid therein.

4. A vessel according to claim 3, wherein said constraining means comprises means for conveying at least one jet of fluid into said chamber in a tangential direction.

5. A vessel according to claim 1 or claim 3 and which is substantially cylindrical in shape with a substantially circular cross-section.

6. A vessel according to claim 1 or claim 3 and provided with means for drawing off a liquid contained therein.

7. A vessel according to claim 1 or claim 3 and which has a hole in a bottom part thereof.

8. A vessel according to claim 7, wherein said hole is lined with a super-refractory material.

9. A metallurgical process apparatus comprising, supported therein, a metal-melting vessel, said vessel having a substantially vertical axis and a refractory internal wall surface, a first means to spin a molten material contained in said vessel unidirectionally about said axis at a first speed, and a second means to cause a least dense portion of said material to spin at a second, slower, speed so as to be separated from said refractory wall surface by a portion of said material which is more dense and spinning at said first, higher, speed.

10. An apparatus according to claim 9, wherein said second means is a brake member immersible in said material.

11. An apparatus according to claim 9, wherein said second means is a means for discharging fluid pressure jet.

12. An apparatus according to claim 9, wherein said vessel is supported for rotation so as to spin said material therein.

13. An apparatus according to claim 9, wherein a reinforced port for the release of said more dense, and more slowly spinning, portion of said material is provided in a wall of said vessel on said axis, said port being of a refractory material which is least resistant to corrosion than said vessel refractory internal wall surface.

14. An apparatus according to claim 12 wherein said first means comprises a drive system connected to said vessel for rotation about its vertical axis, said drive system being capable of rotating said vessel at a rate of at least 60 rpm such that when said apparatus is used to refine a metal at a temperature in excess of 800° C., the slag phase will be separated from said refractory internal wall surface of said vessel by a molten metal phase by the action of said second means.

* * * * *